US006429881B1

United States Patent
Olsen, IV (10) Patent No.: US 6,429,881 B1
(45) Date of Patent: Aug. 6, 2002

(54) METHOD AND SYSTEM FOR TRANSITIONING GRAPHIC ELEMENTS OF A NETWORK INTERFACE DESCRIPTION DOCUMENT

(75) Inventor: Thomas W. Olsen, IV, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/982,722

(22) Filed: Dec. 3, 1997

(51) Int. Cl.[7] .................................................. G06F 3/00
(52) U.S. Cl. ....................................... 345/762; 345/435
(58) Field of Search ................................. 345/333, 335, 345/339, 348, 473, 475, 762, 744, 764, 835, 435; 707/513

(56) References Cited

U.S. PATENT DOCUMENTS 5,353,391 A * 10/1994 Cohen et al. ................ 345/121
5,764,241 A * 6/1998 Elliott et al. ................ 345/473
5,857,064 A * 1/1999 De Silva ..................... 345/522
5,923,885 A * 7/1999 Johnson et al. ............. 345/326
5,956,736 A * 9/1999 Hanson et al. .............. 707/513
5,986,662 A * 11/1999 Argiro et al. ............... 345/424
6,070,176 A * 5/2000 Downs et al. .............. 707/513

* cited by examiner

Primary Examiner—Cao H. Nguyen
(74) Attorney, Agent, or Firm—Leydig, Voit & Meyer (57) ABSTRACT

A method and system for viewing interface description documents, such as Web pages, performs a transition between a first graphic element and a second graphic element which are displayed according to the interface description document being viewed. To allow proper display of the graphic elements over a background, a transparency mask for each of the first and second graphic elements is generated and used in the image transition process. A display image, which is drawn on a video display for viewing, is initialized to contain the first graphic element. During the transition, selected pixels of the display image are replaced by corresponding pixels of the second graphic element over multiple frames until the display image has changed to contain the complete second graphic element.

19 Claims, 6 Drawing Sheets

METHOD AND SYSTEM FOR TRANSITIONING GRAPHIC ELEMENTS OF A NETWORK INTERFACE DESCRIPTION DOCUMENT

FIELD OF THE INVENTION

This invention relates generally to the communication over a computer network, and more particularly to the viewing of an interface screen generated according to a network interface description document, such as a Web page for a World Wide Web site on the Internet.

BACKGROUND OF THE INVENTION

Since its advent in 1992, the World Wide Web on the Internet has made fundamental impacts on the ways information is presented, searched, and exchanged over electronic networks. Tens of thousands of private, government, and commercial Web sites have been set up, and millions of viewers connect to the World Wide Web daily to gather or exchange information.

The viewer interface presented by a Web site is defined in one or more interface description documents provided by the Web site. Such interface description documents are commonly called "Web pages" and are typically written in the Hypertext Markup Language (HTML). Each Web page identifies the contents and form of the interface presentation, and often provides hyperlinks to other information resources. When the Web site is accessed by a viewer, the Web page is transmitted to the viewer's computer. A tool commonly called a "Web browser" on the viewer's computer reads the Web page and displays the information provided by the Web site in a controlled form according to the descriptions in the Web page.

Many Web pages use graphics to enhance the effectiveness of the viewer interface and to make the interface presentation more visually appealing. The graphic elements of a Web page may include, for example, graphic images and graphic control features such as buttons, input boxes, etc. The graphic images used by a Web page are typically stored in separate image files in one of several commonly used graphic file formats, such as GIF and JPEG. The graphic files are transmitted to the Web browser on the viewer's computer, which displays the images in a format compatible with the video display of the viewer's computer.

The use of graphics can have a tremendous impact on the viewer's perception of the information provided by the Web site. Effective use of graphics allows a Web site to become more attractive to viewers to gain a competitive edge over other Web sites that offer similar information or services. It is therefore desirable to be able to display graphic elements of a Web page in interesting ways to enhance the visual appeal of the Web page.

SUMMARY OF THE INVENTION

In accordance with the present invention, there is provided a method and system for viewing a network interface description document, such as a Web page, that displays a transition between a first graphic element and a second graphic element identified by the interface description document. The interface description document is read by a browser on the viewer's computer. The browser determines the transparency of the pixels of the first and second graphic elements to allow proper display of the graphic elements over a background. To start the transition, a display image which is displayed for viewing is initialized to contain the first graphic element. The transition takes place over multiple frames. For each frame, selected pixels of the display image are substituted by corresponding pixels of the second graphic element. The pixel substitutions continues over the multiple frames until the transition of the display image to contain the second graphic element is complete.

The advantages of the invention will become apparent with reference to the following detailed description when taken in conjunction with the drawings.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Figure 1:
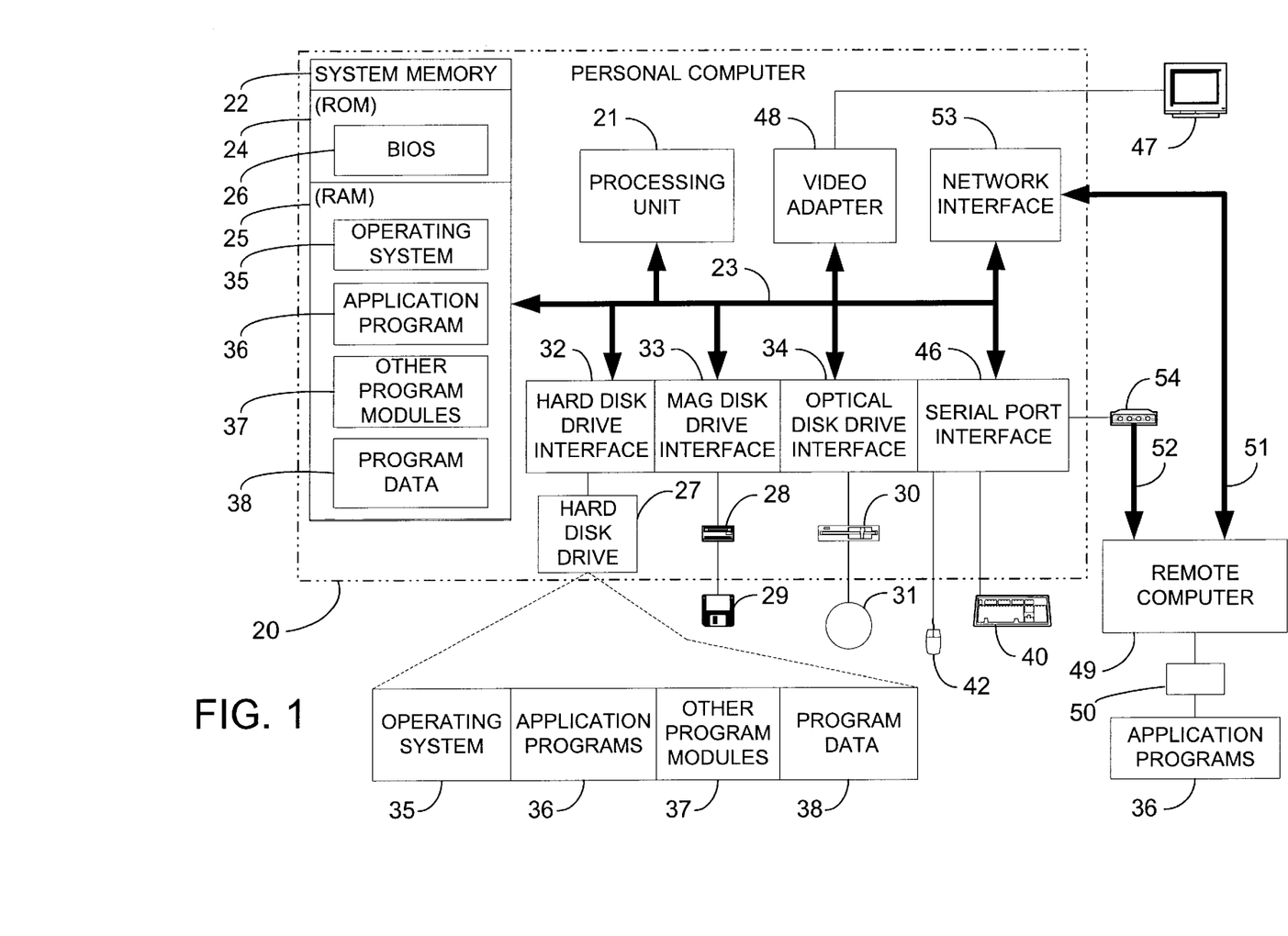
FIG. 1 is a block diagram of an exemplary computer system that may be used to implement a method and system of the invention for displaying a transition between two graphic elements identified in a network interface description document, such as a Web page.

Turning now to the drawings, FIG. 1 and the following discussion are intended to provide a brief and general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, which has a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system 26 (BIOS) containing the basic routines that helps to transfer information between elements within the personal computer 20, such as during start-up, is stored in ROM 24.

The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A viewer may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A video display 47, such as a monitor, is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52, such as the Internet. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention relates to the display of an interface screen which is set up according to an interface description document. As used herein, the term "interface description document" means a document which contains descriptions as to the contents and format of an interface presentation which includes at least a video interface screen. Such an interface description document is typically written in a mark-up language, such as the Hypertext Mark-up Language (HTML), and may include hyperlinks to other information resources. An example of the interface description document is a Web page prepared for a World Wide Web site on the Internet. It will be appreciated by those skilled in the art, however, that the present invention may be advantageously used in other applications besides viewing Web pages on the Internet. For instance, the invention may be used to perform image transition on interface screens set up for a local area network.

Figure 2:
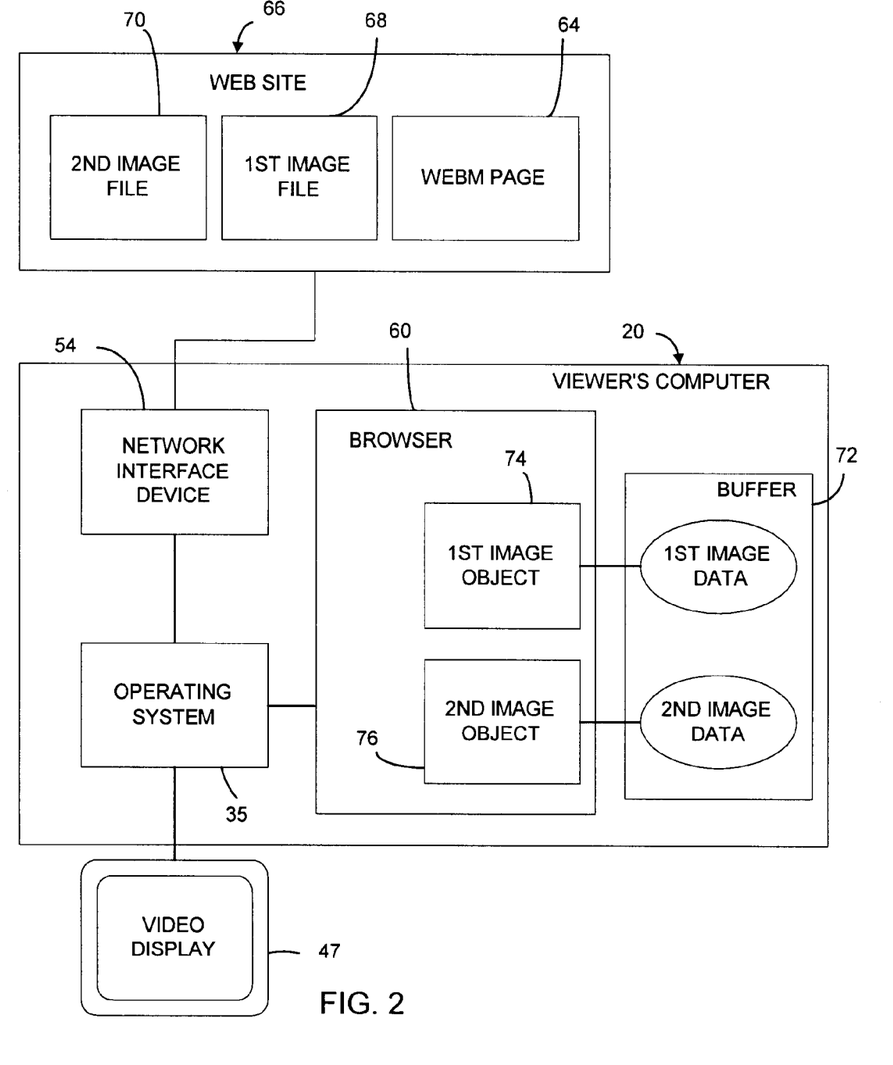
FIG. 2 is a schematic diagram showing a computer system having a browser for viewing a network interface description document.

Turning now to FIG. 2, for illustration purposes, the invention will be described in the context of a computer system 20 which has a browser 60 for viewing a Web page 64 provided by a remote Web site 66 on the Internet. It will be appreciated, however, that this context is used herein only as an example of the possible applications of the invention.

As illustrated in FIG. 2, the computer system 20 for viewing web pages on the World Wide Web is connected to the Internet via an interface device 54 such as a modem. To view the Web page of the remote Web site, the computer system is linked to the Web site through the Internet. The Web page 64 is transmitted to the viewer's computer 20 according to a predefined protocol, such as the Hypertext Transport Protocol (HTTP). The browser 60 reads the Web page 64 and constructs, through the operating system 35 of the computer, an interface screen on a local video display 47 for viewing. The term "browser" as used herein is intended to be read broadly to include plug-ins used to extend the functionality of the browser.

The present invention is directed to the display of a transition between two graphic elements in an interface screen set up according to an interface description document, such as a Web page. The term "transition" as used herein refers to a process in which a displayed graphic element evolves gradually from a first graphic element (the source image) to a second graphic element (the destination image) by pixel substitution over multiple frames. The transition can take many different forms. For example, the first graphic element may sparkle away to reveal the second graphic element, or the second graphic element may sweep in from one side to replace the first graphic element.

For illustration purposes, the following description describes an image transition in which the graphic elements involved are graphic images. It will be appreciated by those skilled in the art, however, that the image transition is not limited to graphic images stored in common graphic file formats. Rather, the graphic elements that can be transitioned according to the invention may be any visible elements that can be placed on the interface screen set up according to the interface description document. For instance, the graphic elements may be basic graphic control features, such as buttons and input boxes, any types of advanced control features, or any visible elements generated by programs embedded in the interface description document.

In the illustrated embodiment, data for the two graphic images involved in the image transition are stored in the first image file 68 and the second image file 70, respectively, in the computer of the Web site. The image files 68 and 70 may be in one of several commonly used image file formats. After the Web page is transmitted to the viewer's computer, the browser reads the Web page to obtain the identification of the first and second image files 68 and 70 and download them from the Web site. In the illustrated embodiment, the downloaded image data are stored in a buffer memory 72. The browser creates a first image object 74 for handling the drawing of the first image. Likewise, a second image object 76 is created for handling the drawing of the second image.

Conventionally, a browser does not have to know the color information, including the transparency, of a visible element to display it. Visible elements are typically treated as rectangular blocks of pixels. Ordinarily, to display a visible element in the interface screen, the browser hands the corresponding visible element object a rectangular memory buffer (which contains the background data) into which the visible element object draws the visible element. The visible element object draws only those portions of the visible element that are opaque. When the drawing operation is done, the browser sends the rectangular block drawn by the visible element object to the video display for display.

This conventional approach allows a browser to handle the display of various types of visible elements without having to deal with the color information of the visible elements. Nevertheless, it also significantly limits how the visible elements can be displayed on the interface screen, since the color information of the visible elements is not directly available to the browser. For instance, if the browser is to assume the responsibility of displaying a transition from one visible element to another, it must know which portions of the visible elements are opaque and which are transparent in order to properly display the visible elements over the background. Without transparency information of the visible elements, the browser is precluded from performing the image transition properly. Because a standard interface for determining the transparency of the various types of visible elements does not yet exist, the browser is prohibited from directly accessing the transparency information of the visible elements. Accordingly, image transition between visible elements in a Web page or the like could not be performed in the past.

In accordance with a feature of the described embodiment, a novel and versatile method is used to obtain the transparency information of the graphic elements involved in the transition without the need to have direct access to the color information of the graphic elements. This method of obtaining transparency information is also independent of the specific format of the image files used and may be applied even if the file format does not support transparency.

Figure 3:
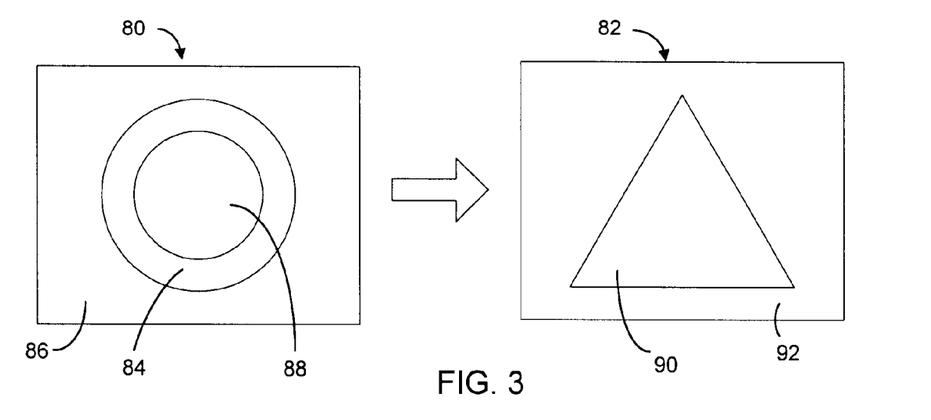
FIG. 3 is a schematic diagram showing two graphic elements involved in an image transition on an interface screen set up according to a network interface description document.

By way of example, the following description illustrates a transition from a first image 80 in to a second image 82, both shown in FIG. 3. Each of the images contains a plurality of pixels. In this example, it is assumed that the image files 68 and 70 for the first and second images are in a format that provides for transparent pixels so that each of two images contains opaque regions and transparent regions. More particularly, the first image 80 contains a ring-shaped image feature 84 that is opaque, and the remaining portions 86 and 88 of the first image are completely transparent. Image B contains a triangular opaque image feature 90 and a transparent region 92 surrounding the triangular image feature.

Figure 7A:
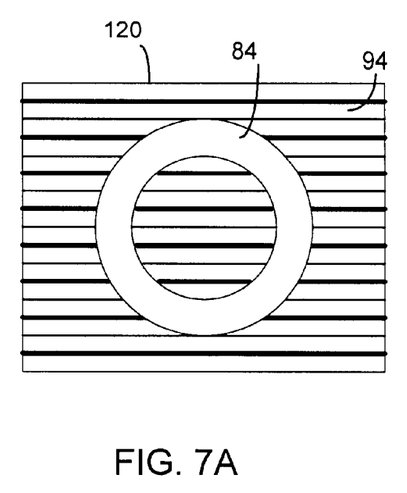
FIGS. 7A–7D is a schematic diagram illustrating multiple frames of a transition between two graphic elements.
Figure 7B:
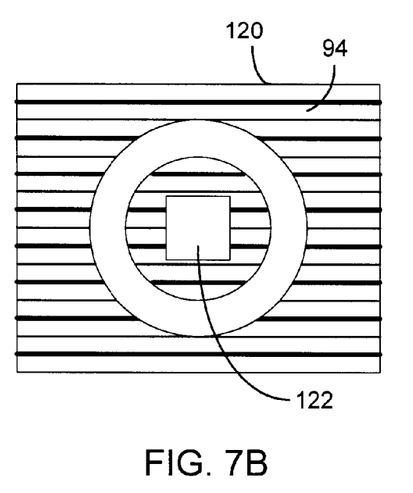
Figure 7C:
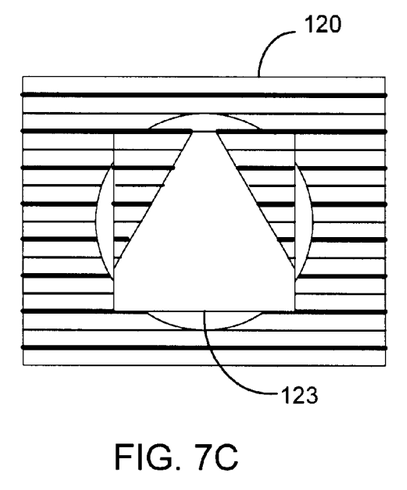
Figure 7D:
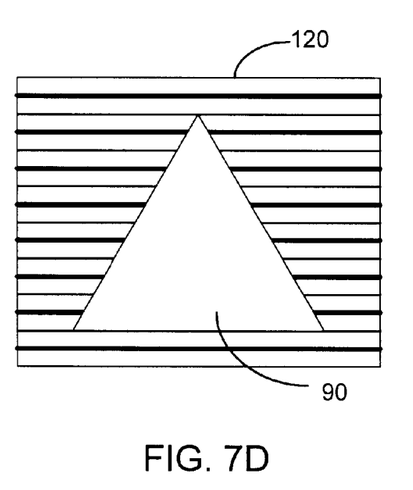

FIG. 7A shows the first image 80 drawn over a background 94 as part of an interface screen 120, and FIG. 7D shows the second image 82 drawn over the same background. As shown in FIGS. 7A and 7D, the background image 94 is visible through the transparent portions of first and second images, thereby creating an effect of the image features 84 and 90 floating above the background. The background image may be selected by the Web page 64 (FIG. 2). Alternatively, the browser 60 may provide the background image.

In accordance with the invention, a gradual transition from the first image 80 to the second image 82 is displayed by the browser 60 on the video display. The transition starts from the interface screen of FIG. 7A to the interface screen of FIG. 7D over multiple frames. As described in greater detail below, the transition may be carried out in many different forms.

Figure 4:
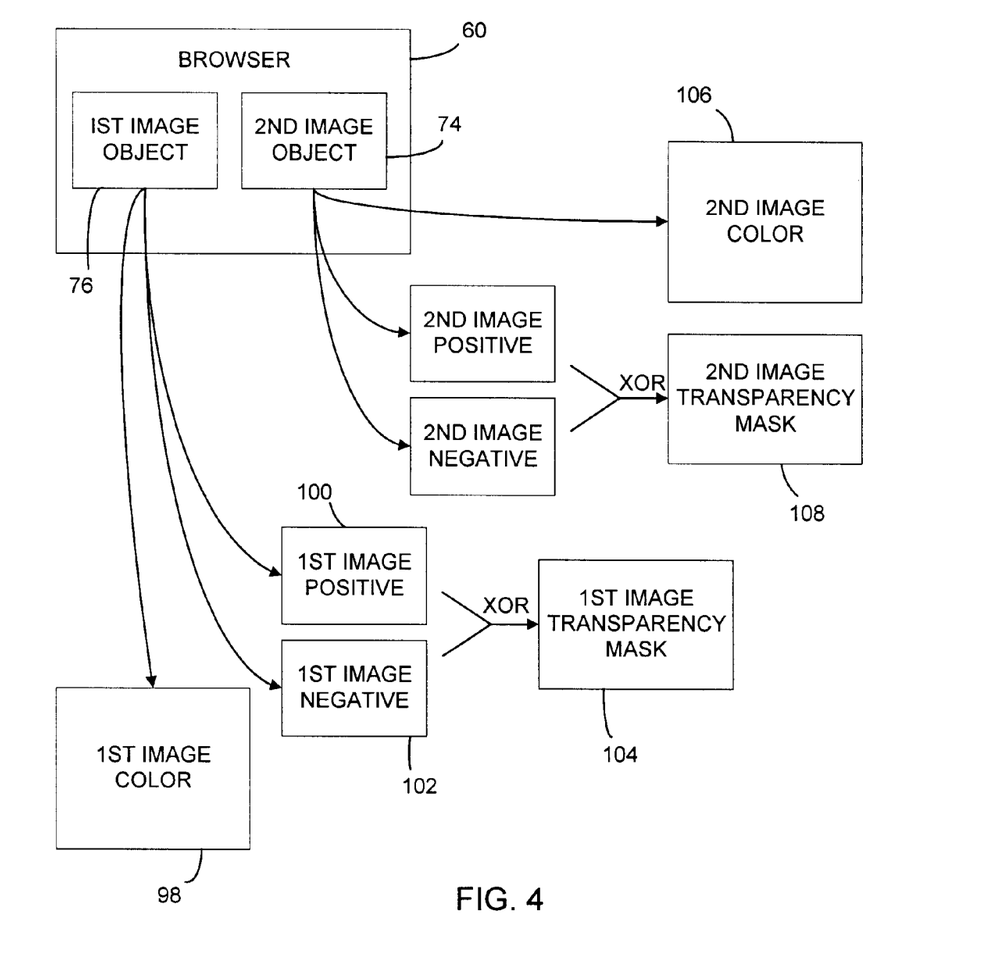
FIG. 4 is a schematic diagram showing the generation of transparency masks for two graphic elements involved in an image transition.

To properly display the images during the transition, transparency information for the pixels of the images is required. In the present embodiment, the color and transparency information of each of the first and second images 80 and 82 is generated in a way that does not depend on the specific format of the image files. Turning now to FIG. 4, the color information of the first image is obtained by requesting the first image object 76 to draw the image into the computer memory in a color format compatible with the video display 47 of the computer. The transparency information of the first image is obtained by drawing the first image into the memory according to a given palette to form a positive image 100, and then drawing the first image according to the inverse of the given palette to form a negative image 102. The positive and negative images are then compared to determine which pixels of the first image are transparent.

In the present embodiment, the positive and negative images 100 and 102 are monochromatic images such that only one memory bit is required for each pixel. An opaque pixel in the first image may have a value of 0 (dark) or 1 (bright) in the positive image 100, depending on the palette chosen. Due to the inverted palette used for the negative image, an opaque pixel which has a value of 1 in the positive image 100 would have a value of 0 in the negative image 102. Conversely, an opaque pixel which has a value of 0 in the positive image would have a value of 1 in the negative image. In contrast, all transparent pixels in the first image would have a value of 0 in both the positive and negative images. The transparency of each pixel in the first image is determined by performing an XOR operation on the corresponding bits of the positive and negative images:

$$T = XOR(v+, v-),$$

where v+ is the bit value in the positive image 100, v− is the bit value in the negative image, and T is the transparency value for that pixel. T=0 indicates that the pixel is transparent, and T=1 indicates that the pixel is opaque. In the illustrated embodiment, the T values for the pixels of the first image is stored in a one-bit deep transparency mask 104. A color image 106 and a transparency mask 108 are likewise generated for the second image.

Figure 5:
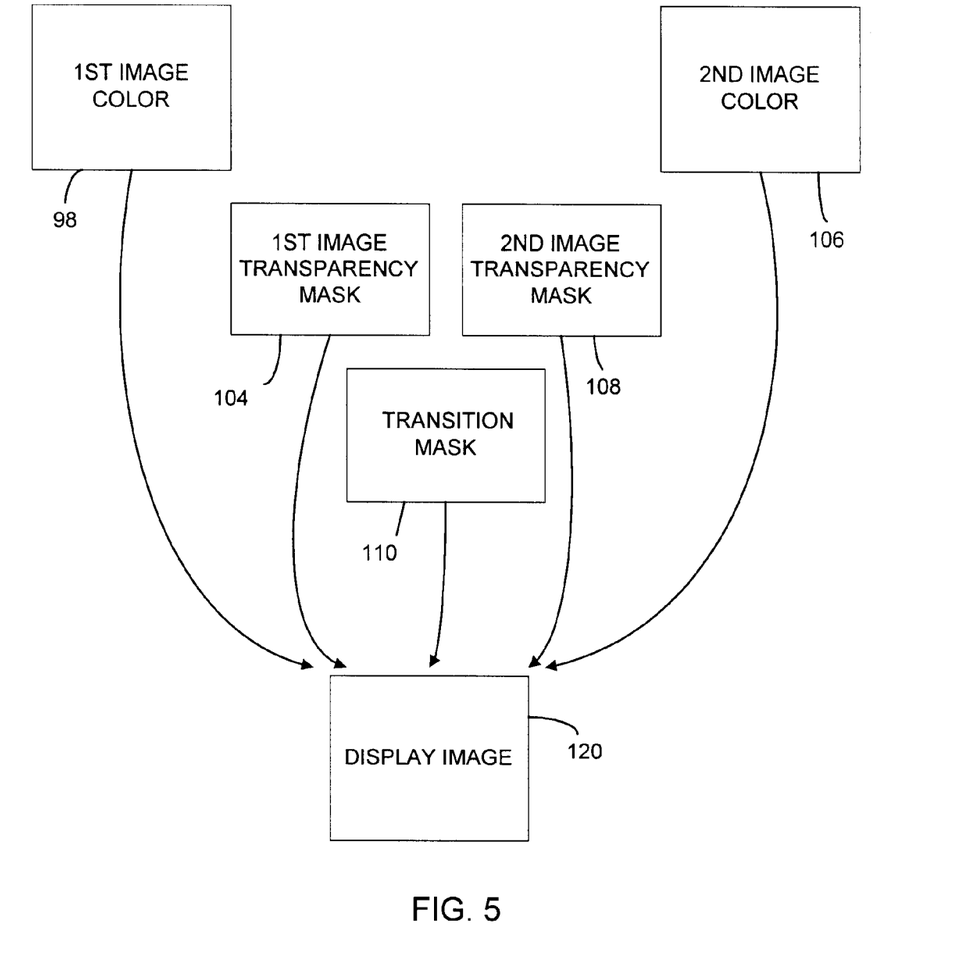
FIG. 5 is a schematic diagram showing two graphic elements involved in an image transition and a transition mask for implementing the image transition.

After the color and transparency information of the pixels of the first and second images is obtained, the image transition is carried out. Turning now to FIG. 5, a display image 120 is created for display on the video display during the transition. At the beginning of the image transition, the display image 120 is initialized so that each pixel of the display image is set to have the color (which may be transparent) of a corresponding pixel in the first image. Over the course of multiple frames, the pixels of the display image are gradually changed to have the colors of the corresponding pixels of the second image.

In the illustrated embodiment, a transition mask 110 is used to keep track of the pixel substitution over multiple frames. The transition mask is preferably one-bit deep to minimize the memory space required. The state (0 or 1) of each bit in the transition mask indicates whether a corresponding pixel in the display image should have the color of a corresponding first image pixel or the color of a corresponding second image pixel.

Figure 6:
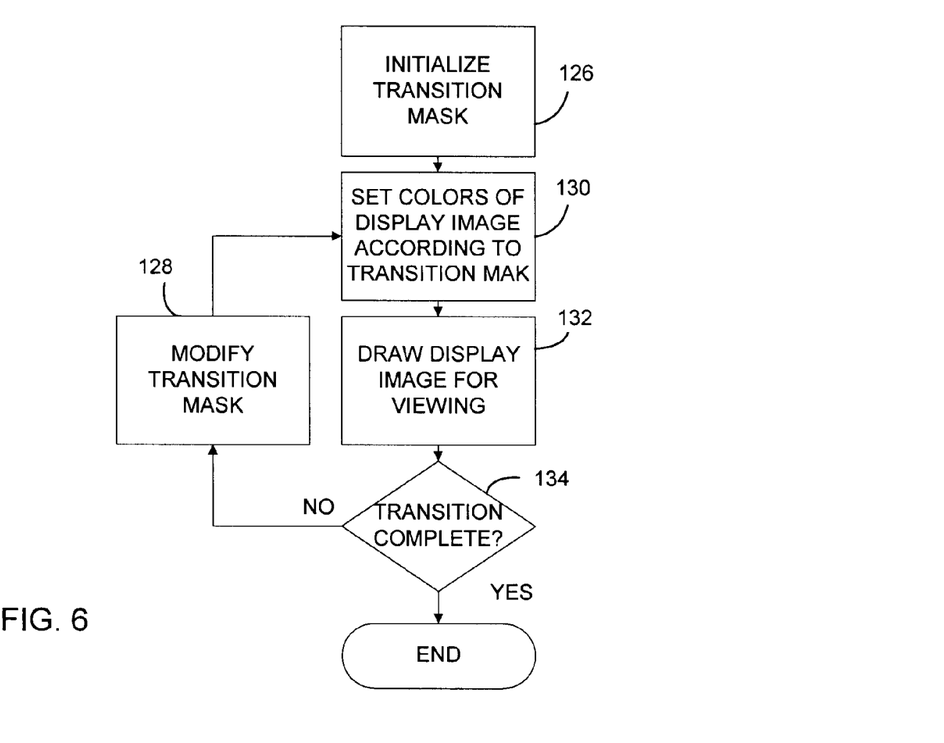
FIG. 6 is a flowchart showing steps executed in an embodiment of the invention to display a transition between two graphic elements on an interface screen.

Turning now to FIG. 6, at the beginning of the transition, the transition mask 110 is initialized (step 126) such that each bit in the transition mask is set to 0, which indicates that each pixel in the display image 120 is to have the color of the corresponding pixel of the first image. For each of the subsequent frames of the transition process, bits of the transition mask are changed from 0 to 1 in a preselected manner (step 128), and the pixels of the display image are set according to the bits in the transition mask (step 130). The color of a first image pixel is copied into a corresponding display image pixel when the first image transparency mask bit is 1 and the first transition mask bit is 0. The color of the corresponding second image pixel is copied into the display image pixel if the second image transparency mask bit is 1 and the transition mask bit is 1. Otherwise the display image pixel is set to be transparent, i.e., the background pixel underlying the display image pixel is shown on the video display.

In the present embodiment, this is carried out by determining the values of the variables CopyF and CopyS for each pixel:

Copy$F$=$FTM$bit AND (TransMbit $XOR$ 255),

Copy$S$=$STM$bit AND TransMbit, where FTMbit is the value of the corresponding bit of the first image transparency mask, STMbit is the value of the corresponding bit of the second image transparency mask, and TransMbit is the value of the corresponding bit of the transition mask. The color of the first image pixel is copied into the display image pixel if CopyF is 1. The color of the second image pixel is copied into the display image pixel if CopyS is 1. The display image pixel remains transparent if both CopyF and CopyS are 0.

After the colors of the display image are set, the display image is drawn on the video display for viewing (step 132). The steps of modifying the transition mask, resetting the display image according to the transition mask, and displaying the display image are repeated for each frame until the display image has changed completely into the second image (step 134).

There are many different ways to modify the transition mask over multiple frames to create interesting visual effects of the image transition. Generally, information relating to the specific transition, such as the number of frames of the image transition process and which bits of the transition mask are to be modified for a given frame, may be provided by the interface description document which is being viewed with the browser. Such information is often referred to as a "filter." Alternatively, the browser itself or the viewer may select the filter for the transition. The visual effect of the image transition can be easily customized by tailoring the filter used for modifying the transition mask over multiple frames.

By way of example, FIGS. 7A–7D show frames of a transition of the display image 120 from the first image 80 to the second image 82 using a specific filter which creates the effect of revealing the second image through an expanding square window. As shown in FIG. 7A, at the beginning of the transition, all bits of the transition mask is set to 0, and the display image 120 is initialized to contain the first image feature 84. At an intermediate frame as shown in FIG. 7B, bits in the transition mask that correspond to a square region 122 in the display image 122 are set to 0, and the pixels in the square region are set to contain colors of the corresponding pixels of the second image. At a later intermediate frame as shown in FIG. 7C, more bits in the transition mask are set to 0 such that a larger square region 123 is created to reveal the second image. The expansion of the square window continues over multiple frames by setting bits in the transition mask to 1 until the colors of the entire display image 120 have been replaced by those of the second image, as shown in FIG. 7D.

It can be appreciated from the foregoing detailed description that the invention provides a simple, efficient, and versatile way to perform a transition between two graphic elements on an interface screen set up according to an interface description document such as a Web page. The simplicity of the approach and its independence of the types and formats of the graphic elements make it easy to develop different forms of image transition to create many interesting visual effects.

What is claimed is:

1. A method for displaying graphic elements identified in an interface description document written in a mark-up language, comprising the steps of:

reading the interface description document to obtain identification of a first graphic element and a second graphic element to be displayed consecutively through transitioning for viewing;

initializing a display image to contain the first graphic element;

displaying on a video display the display image in an interface screen constructed according to the interface description document for viewing; and replacing, over multiple frames, pixels of the display image with corresponding pixels of the second graphic element until the display image has changed to contain the second graphic element.

2. A method as in claim 1, wherein the step of reading includes retrieving the interface description document from a remote network site.

3. A method as in claim 1, wherein the interface description document is a Web page.

4. A method as in claim 1, wherein the step of replacing includes modifying a transition mask over multiple frames, and substituting, for each of the multiple frames, selected pixels of the display image with corresponding pixels of the second graphic element according to the transition mask.

5. A method as in claim 1, further including the step of determining transparency of pixels in the first and second graphic elements for display over a background.

6. A method as in claim 1, wherein the step of reading includes obtaining from the interface description document information regarding performing the step of replacing over multiple frames.

7. A method for viewing graphic elements identified in an interface description document written in a mark-up language, comprising the steps of:

reading the interface description document to obtain identification of a first graphic element and a second graphic element to be displayed consecutively through transitioning for viewing;

determining transparency of pixels in the first and second graphic elements for display over a background;

initializing a display image to contain the first graphic element;

displaying the display image in an interface screen constructed according to the interface description document for viewing;

replacing selected pixels in the display image with corresponding pixels of the second graphic element;

repeating the displaying and replacing steps over multiple frames until the displayed image has changed to contain the second graphic element.

8. A method as in claim 7, wherein the step of determining transparency draws each of the first and second graphic elements into a positive image and a negative image, and compares the positive and negative images to determine transparency of pixels in said each of the first and second graphic elements.

9. A method as in claim 7, wherein the step of reading includes retrieving the interface description document from a remote network site.

10. A method as in claim 7, wherein the interface description document is a Web page.

11. A method as in claim 7, wherein the step of replacing includes modifying a transition mask, and substituting selected pixels of the display image with corresponding pixels of the second graphic element according to the transition mask.

12. A method as in claim 11, wherein the transition mask is one-bit deep.

13. A method as in claim 7, wherein the step of reading includes obtaining from the interface description document information regarding performing the step of replacing over multiple frames.

14. A computer-readable medium having computer-executable instructions for performing steps for displaying graphic elements identified in an interface description document written in a mark-up language, comprising:

reading the interface description document to obtain identification of a first graphic element and a second graphic element to be displayed consecutively through transitioning for viewing;

initializing a display image to contain the first graphic element;

displaying on a video display the display image in an interface screen constructed according to the interface description document for viewing; and replacing, over multiple frames, pixels of the display image with corresponding pixels of the second graphic element until the display image has changed to contain the second graphic element.

15. A computer-readable medium as in claim 14, having further computer-executable instructions for performing the step of determining transparency of pixels in the first and second graphic elements for display over a background.

16. A computer-readable medium as in claim 15, wherein the step of reading includes retrieving the interface description document from a remote network site.

17. A computer-readable medium as in claim 16, wherein the interface description document is a Web page.

18. A computer-readable medium as in claim 15, wherein the step of reading includes obtaining from the interface description document information regarding performing the step of replacing over multiple frames.

19. A computer-readable medium as in claim 15, wherein the step of replacing includes modifying a transition mask over multiple frames, and substituting for each of the multiple frames selected pixels of the display image with corresponding pixels of the second graphic element according to the transition mask.

* * * * *